United States Patent [19]

Circeo, Jr. et al.

[11] Patent Number: 5,181,795
[45] Date of Patent: Jan. 26, 1993

[54] IN-SITU LANDFILL PYROLYSIS, REMEDIATION AND VITRIFICATION

[76] Inventors: Louis J. Circeo, Jr., 4245 Navajo Trail, Atlanta, Ga. 30319; Salvador L. Camacho, 8913 O'Neal Rd., Raleigh, N.C. 27612

[21] Appl. No.: 931,962

[22] Filed: Aug. 19, 1992

[51] Int. Cl.$^5$ .......................... E02D 3/00; E02D 3/11
[52] U.S. Cl. .................... 405/128; 405/131; 405/258
[58] Field of Search ............... 405/128, 125, 258, 131; 166/248, 260; 219/213, 415; 392/301, 305

[56] References Cited

U.S. PATENT DOCUMENTS

| | | | |
|---|---|---|---|
| 4,376,598 | 3/1983 | Brouns et al. | 405/258 |
| 5,004,373 | 4/1991 | Carter | 405/131 |
| 5,011,329 | 4/1991 | Nelson et al. | 405/128 |
| 5,076,727 | 12/1991 | Johnson et al. | 405/131 X |
| 5,100,259 | 3/1992 | Buelt et al. | 405/128 |

FOREIGN PATENT DOCUMENTS

| | | | |
|---|---|---|---|
| 0630338 | 9/1978 | U.S.S.R. | 405/131 |
| 0685762 | 9/1979 | U.S.S.R. | 405/131 |
| 0905370 | 2/1982 | U.S.S.R. | 405/131 |

Primary Examiner—Dennis L. Taylor
Attorney, Agent, or Firm—Olive & Olive

[57] ABSTRACT

The process of the present invention serves to remediate and reduce the volume of waste materials in a landfill site and increases the useful life of the treated landfill. The process steps involve drilling a series of holes into the waste material mass at proper spacing, inserting and operating a plasma arc torch in each drilled hole to pyrolize, remediate and vitrify the waste materials and allowing the melted materials to cool and harden. During the process, a gaseous by-product is produced and collected in a hood which is attached to scrubbing and chemical cleaning apparatus. The resultant gases are commercially useful as fuel gas and the vitrified residue is significantly smaller in volume than the original waste material volume, thus substantially extending the useful life of the landfill site and ultimately providing a firm foundation for construction.

13 Claims, 3 Drawing Sheets

IN-SITU LANDFILL PYROLYSIS, REMEDIATION AND VITRIFICATION

REFERENCE TO RELATED APPLICATION

Related copending application Ser. No. 07/827,384 filed Jan. 29, 1992 for "IN-SITU SOIL STABILIZATION METHOD AND APPARATUS" provides useful background for the present application.

FIELD OF INVENTION

The invention relates to the treatment of residential and industrial waste as found in a landfill site.

BACKGROUND OF THE INVENTION

Environmental consequences of the contemporary lifestyle in this country frequently result in dramatic problems in a number of areas of public concern. A major related concern is the need to increase the capacity for disposing of residential and industrial wastes.

One of the political topics which tends to generate the most public response is the topic of finding a location for a new landfill facility. Everyone generates waste, and yet no one wants to have a waste disposal site or a waste incinerator nearby. The reasons for this public dislike of waste disposal facilities ranges from toxic hazards, to leaching of dangerous chemicals into the groundwater, to unpleasant odors and to reduction in real estate values.

Despite this generally held dislike for landfills, the need for more waste disposal capacity keeps growing. We produce more waste each year and the existing landfills are rapidly approaching the point of being filled to capacity. The problem encompasses residential waste such as bio-degradable and non-biodegradable garbage and industrial waste including scrap, chemical residues, sludge, mill tailings, and other forms of waste, some of which may be industrial, hazardous, toxic or radioactive. Common municipal solid waste is being generated at the rate of over 200 million tons per year. Over ninety percent (90%) of this waste is deposited in landfills. At this rate, more than half the operating landfills in the country will reach their limit of capacity within the next few years. Efforts at recycling, while helpful, fall far short of coping with the problem.

A typical landfill contains a great variety of materials, only a small number of which will decompose naturally. A weight analysis of landfill components by category indicates paper products (41%), glass and metal (16.9%), plastics (6.5%), rubber and textiles (4.3%), yard waste (17.9%), wood (3.7%) and food (7.9%).

The process of incineration deals somewhat with the capacity problem, but it simultaneously creates other problems, such as pollution, odors, acid rain, depletion of fuels, etc. Incineration, by its nature, is a combustion process and, therefore, generates a number of gaseous products which range from unpleasant to dangerous.

Pyrolysis is a chemical decomposition of materials due to the action of heat. Pyrolysis is distinct from combustion in that oxygen is not present and, therefore, the resulting chemical products are different. When pyrolysis of materials is accomplished under sufficiently hot conditions, some gases (potentially useful as fuel) are generated due to decomposition of the organic compounds, and the residue from the waste materials is melted and solidified (vitrified), thus greatly reducing its volume. The chemical composition of the gases generated by pyrolysis can be controlled by the introduction of specific additives, such as steam.

The present invention recognizes that there exists a relatively new technology which may be employed in the pyrolysis and vitrification of waste materials by the application of quantities of very high temperature heat energy. The basic tool used in this technology is the plasma arc torch. Plasma arc torches can routinely operate at temperatures of 4000° C. to 7000° C. in the range of 85-93% electric to heat energy efficiency. The highest temperature attainable by fuel combustion sources is in the vicinity of 2700° C.

A plasma arc torch operates by causing a high energy electric arc to form across a stream of plasma, or ionized gas, thus generating large amounts of heat energy. There are many types of plasma torches, but all torches generally fall into one of two basic categories according to the arc configuration relative to the torch electrodes, i.e., transferred arc type and non-transferred arc type. The arc of a transferred arc torch is formed by and jumps from a single electrode on the torch, through the plasma gas, and to an external electrode which is connected to an opposite electrical pole. The arc of a non-transferred arc torch is formed by and jumps from one electrode on the torch across the plasma gas to another electrode on the torch.

In a plasma arc torch, the heat energy produced is proportional to the length of the arc, assuming the type of plasma gas and flow of electrical current both remain constant.

Since the present invention makes use of a plasma arc torch, reference is next made to U.S. Pat. No. 4,067,390 granted to the present inventors for "Apparatus And Method For The Recovery Of Fuel Products From Subterranean Deposits Of Carbonaceous Matter Using A Plasma Arc" which teaches the use of a plasma arc torch to gasify or to liquify underground deposits of coal, oil, oil shale and other carbonaceous materials. The teachings of the '390 patent are incorporated herein by reference.

SUMMARY OF THE INVENTION

The present invention provides a method and apparatus for reducing the volume of waste products, including those containing toxic or low-level radioactive materials, in a safe manner and for generating and collecting potentially useful gases at the same time. A plasma torch is inserted to the bottom of a drilled and cased hole in a landfill that is closed or approaching its capacity. The torch is energized in the non-transferred mode to generate heat in the 4,000°-7,000° C. range so as to pyrolyze and vitrify materials in its vicinity. Useful gases for cogenerataion or as an alternate fuel source are simultaneously generated, collected and cleaned; i.e., the effluent gases must be treated to ensure that no hazardous effluents are released to the atmosphere. Due to the natural low density of landfill wastes, the vitrified waste materials are considerably more compact than the original materials. As the waste becomes more melted, a molten pool forms, a void is created around the torch and additional waste falls into the molten pool, adding to the melt. As the level of the molten pool rises and approaches the plasma torch, the torch is raised in the borehole to a new operating level. This process is repeated in successive holes throughout the landfill until the entire landfill has been treated and the surface level of waste has subsided to near the bottom of the landfill basin. When the reduction of the waste volume has been completed, the process of filling with added municipal or industrial waste is resumed. The entire procedure of pyrolysis and vitrification is repeated a number of times over a number of years until the level of vitrified material residue builds up to where it is at or near the original ground level. Thus, the landfill is fully remediated, the useful life of the landfill has been extended and a firm, inert foundation for construction has been established.

DESCRIPTION OF THE PREFERRED EMBODIMENT

Figure 1:
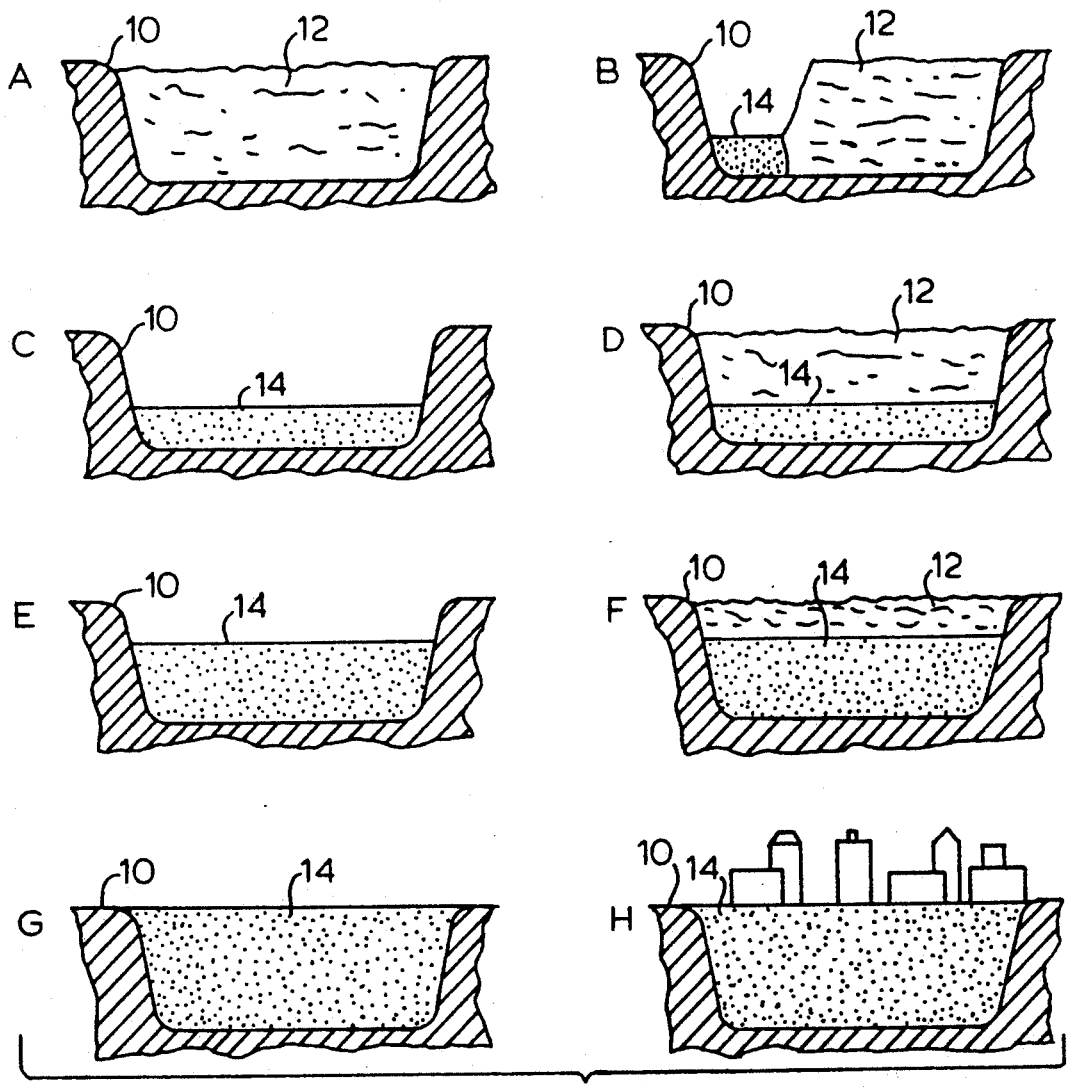
FIG. 1 is a schematic representation presented as a series of steps A-H of a landfill site portraying the method of the invention being practiced sequentially over time to minimize the volume of waste while maximizing landfill life and land utilization.

Depicted in a series of process steps in section view in FIG. 1, basin 10 is a natural or manmade cavity in the surface of the earth which serves as the site of a typical landfill into which materials are dumped until no more space is available. At that time, the waste material can be completely remediated and a volume reduction according to the present invention may be employed to increase the life and effective capacity of the site. In FIG. 1, step A, the landfill basin 10 is filled with waste materials 12 to approximately its capacity. According to the method and by utilizing the apparatus of the invention, as will be described in detail later, waste remediation and a significant reduction in the volume of the former waste material 12 may be accomplished.

The result of the first phase of remediation and reduction in waste volume is illustrated in FIG. 1, step B, wherein the basin 10 still contains untreated waste materials 12 and treated, or vitrified residue 14. As it is shown, the pyrolysis and vitrification process to be described effectively reduces the volume of material in comparison to the untreated waste material 12.

The treatment process is continued in successive locations throughout the landfill area until a condition approximating that portrayed in FIG. 1C is reached in which all the waste materials which had previously filled basin 10 are now remediated and reduced by pyrolysis and vitrification to a fraction of their original size in the form of a hard, glass-like, vitrified residue 14. Optionally, multiple locations of waste within a landfill site may be treated simultaneously so as to reduce the time required for the total process. Thereafter, for a period of time, additional waste material 12 may be deposited into basin 10 on top of vitrified residue 14 until the level of waste materials 12 again reaches the maximum volume capacity as shown in FIG. 1D.

A process approximating that described above in regard to steps 1B and 1C is undertaken again to result in a volume of vitrified residue 14 as illustrated in FIG. 1E. The resultant volume of vitrified residue 14 as represented in FIG. 1E is the total amount from the first and second vitrification processes shown in FIGS. 1C and 1E.

Subsequently, additional waste material 12 is dumped into the basin 10 to arrive at the condition shown in FIG. 1F, which, after several cycles of this process, will be followed by a further pyrolysis and vitrification process resulting in a vitrified residue 14 which, after several cycles of the inventive process, ultimately approximates the maximum capacity of basin 10 as shown in FIG. 1G. The actual number of steps required to complete this sequential vitrification process and result in a vitrified residue 14 which is substantially level with the top of basin 10 will vary according to a number of factors such as the waste composition and depth. FIG. 1 is therefore a somewhat simplified sequence for purposes of illustration.

When the vitrified residue 14 is at or near the level of the earth surrounding basin 10, and due to the extremely hard, dense and inert nature of vitrified residue 14, it is possible and useful to construct upon vitrified residue 14, returning the land to a further useful purpose, as illustrated in FIG. 1H. The exposure of waste materials 12 to the extremely high temperatures of the invention process (discussed below), in addition to reducing volume of waste, effectively neutralizes, gasifies, or immobilizes the original contaminants and low level radioactive materials, thus making a safe and strong base for future construction. Whereas the typical filled landfill site is totally unsuited and hazardous as a building site because of subterranean toxic materials, settlement and potentially explosive gases, the method of the invention, by contrast, provides the mentioned strong and safe foundation for future construction.

In addition to providing a societal useful purpose for the landfill site after it has filled all available space, the invention has, as described above, effectively remediated the waste materials, increased the useful life and effective capacity of the landfill site to a substantial extent, and reclaimed commercially useful gases.

Figure 2:
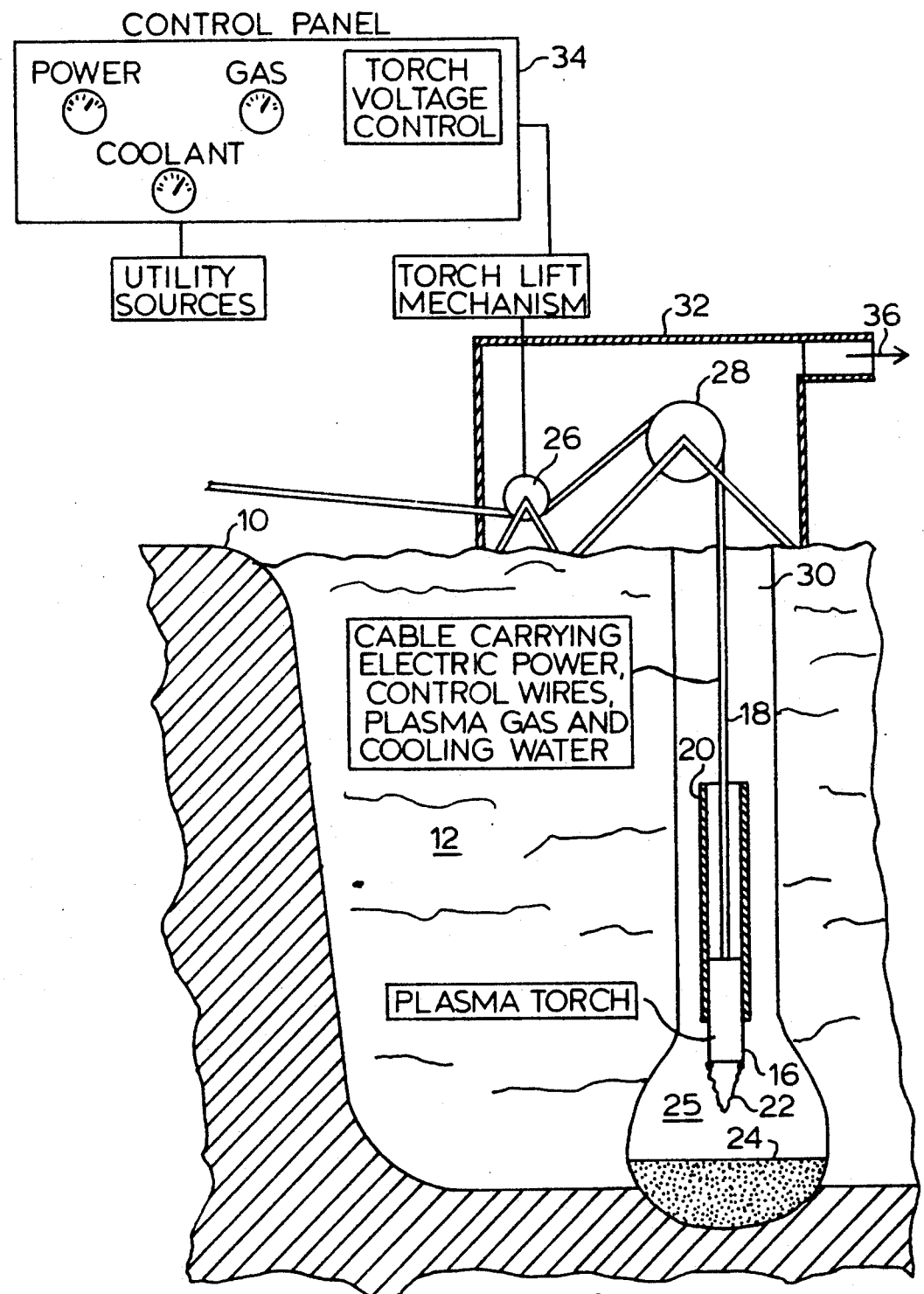
FIG. 2 is a sectional elevational view of the method and apparatus of the invention illustrating a plasma torch installed in a drilled hole extending to the bottom of a landfill and a gas collecting hood assembled above the processing hole.

To accomplish the objectives of the invention as portrayed in the foregoing description of the method employed, a source of high heat energy is needed. A particularly controllable and efficient source of high temperature heat is the plasma arc torch. A typical plasma arc torch which is suitable for treating waste materials has a one megawatt electrical power rating and is of cylindrical shape, approximately 22 cm in diameter. It is preferred, in reference to FIG. 2, that the diameter of the formed hole be 5-10 cm larger than the diameter of the plasma torch. Therefore, as illustrated in FIG. 2, borehole 30 is formed, e.g. by drilling, to have about a 30 cm diameter for torch clearance. Plasma torches of higher power ratings are generally proportionally larger in diameter. Torches rated at from 300 kw to 10 Mw power rating can be employed according to the requirements of the landfill, provided the hole diameter is appropriate and adequate electrical power is available. A plasma torch applicable to the method and apparatus of the invention is produced by Plasma Energy Corporation, Raleigh, N.C. It is generally desirable to insert a substantially rigid tubular casing made of any heat destructible material, such as thin metal, into the drilled borehole 30. The casing acts to prevent sidewall collapse and to facilitate the movement of plasma torch 16 down and up borehole 30. So as to additionally facilitate insertion and movement of plasma torch 16, hole 30 is drilled vertically into the landfill waste mass 12.

Plasma torch 16, preferably with arc forming means operative to form a non-transferred arc, is lowered into cased borehole 30 with plasma gas, electric supply and cooling water lines connected, which utility lines are carried by a common supply conduit 18. A protective heat resistant shroud 20 is provided and extends upwardly from the upper portion of plasma torch 16 to insulate the utility lines carried in supply conduit 18 from the damaging heat travelling connectively upward in hole 30. Plasma torch 16 is energized to generate heat in the range of 4000° C. to 7000° C., which is hot enough to readily melt the borehole casing and decompose and pyrolyze the waste materials 12 surrounding hole 30. Torch 16 transmits its heat energy by a combination of radiation and convection. The majority of the convection heat will travel upward along bore hole 30, and the radiation energy will begin to melt the waste materials 12 around bore hole 30 and will create a substantially spherical chamber 25 as the waste melts and collects in a pool of molten waste 24.

Beyond the ability of a plasma arc to operate at exceedingly high temperatures, the energy generated is unusual in its frequency distribution. The energy generated by conventional combustion processes occurs mostly in the infrared section of the electromagnetic spectrum, largely in the visible light section and marginally in the ultra-violet section. By contrast, the energy generated by a plasma arc will be as much as 29% in the ultra-violet portion of the spectrum. Ultra-violet energy wavelengths are able to penetrate gasses without measurable heat loss and to penetrate solids more quickly and effectively than infra-red wavelengths.

The operating plasma torch 16 utilizes an ionized gas flowing under pressure and forms an electric arc supported by that gas. Input electric power, plasma gas and coolant are each regulated by conventional means (not shown) located within a suitable control panel 34.

As the heat of plasma arc flame 22 pyrolyzes waste materials 12, spherical chamber 25 develops and widens around torch 16. As the level of the molten pool rises and approaches the plasma torch, the torch 16 is raised in the borehole to a new operating level 25, thus providing additional material for plasma torch 16 to pyrolyze into molten waste material 24. Plasma torch 16 may be raised automatically or by manual controls. This process may encompass a volume of up to five (5) meters in diameter, according to the characteristics of the waste 12 and the power level of plasma torch 16.

When a column of the diameter of chamber 25 and a height up to the top of basin 10 is pyrolyzed and the vitrified residue 14 sits at its bottom, plasma torch 16 is deenergized and removed. A torch lifting mechanism 26 and pulley 28 are employed to remove plasma torch 16. A new borehole is formed in another position in the landfill and the process is repeated until the entire volume of the landfill has been treated. The spacing of additional boreholes 30 for treating additional waste material 12 in the landfill will be determined according to the effective diameter of the column achieved at first borehole 30 so as to treat the entire landfill volume and ensure that successive vitrified columns coalesce into a solid mass.

Figure 4:
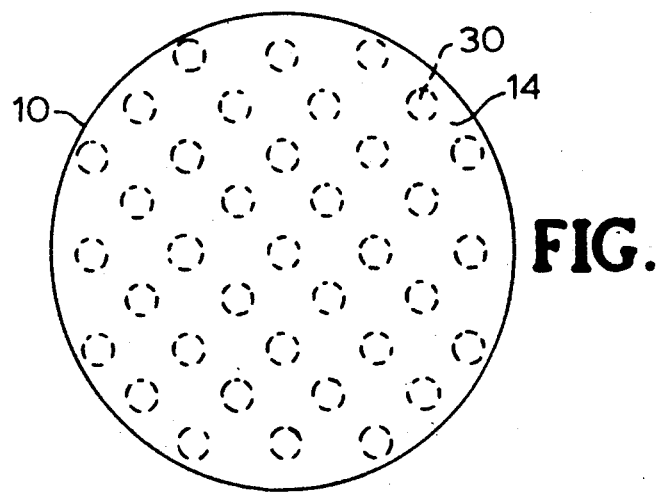
FIG. 4 is a plan view of the surface of a landfill site after treatment according to the invention, showing the original borehole locations in dashed lines.

FIG. 4 illustrates a typical arrangement of boreholes 30 in a landfill basin 10. Boreholes 30, shown in dashed lines, are separated by a distance such that when the vitrified residue 14 has cooled, the individual vitrified columns will have coalesced together to a substantially solid, continuous mass on which future construction may be built.

During the described process of melting waste materials 12, the heating occurs in an area accessed by a relatively small diameter borehole 30. In this situation, little if any atmospheric air reaches the site of the high heat application. The plasma gas used may be air, since it is economical and readily available, but the quantity of air supplied to support the plasma arc flame 22 is so much less than the amount needed to burn the quantity of waste being treated as to be negligible. Under conditions of high heat and little air, or oxygen, combustion is not possible. At the same time, pyrolytic chemical reactions, including decomposition of some of the waste materials and further reaction with added steam (see FIG. 3) will take place. These chemical reactions give off a variety of gases, some of which are commercially useful, particularly as fuel. These resultant gases include hydrogen, carbon monoxide, carbon dioxide, methane, nitrogen and others. An analysis of typical gases resulting from the process described indicates a total of 27,000 standard cubic feet of gas by-product generated from each ton of typical municipal waste materials pyrolyzed. Processing of industrial or other special waste materials may result in a different volume and different types of gases given off.

A gas collecting hood 32, as shown in FIG. 2, is placed over the top of borehole 30 to trap and route the gases produced to a treatment station, such as a cleaning operation, prior to storage for recycling. Gases exit gas collecting hood 32 at arrow 36, representing output gases, and are conducted into a piping system (not shown) for chemical cleaning or scrubbing.

Figure 3:
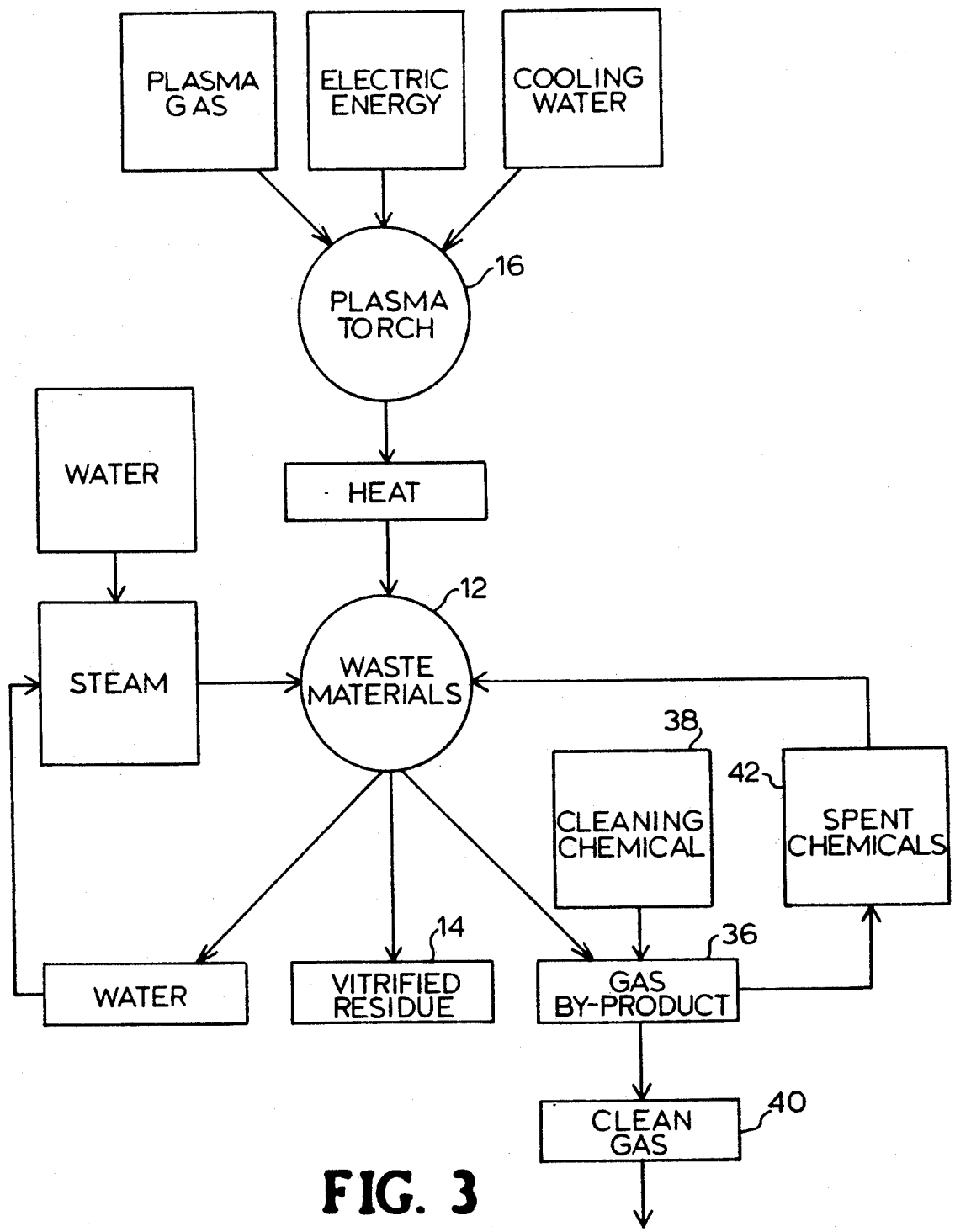
FIG. 3 is a flow chart representation of the process of the invention indicating the input and output products.

The pyrolysis, remedation and vitrification of waste materials by the plasma torch and the subsequent handling of the gas by-product is depicted in the form of a process chart in FIG. 3. Plasma torch 16 is supplied with its three needed inputs, i.e. plasma gas, electric energy and cooling water. The water is not fed as a utility supply to the torch 16, but circulates around and within the body of torch 16 so as to prevent the plasma torch 16 from being destroyed by its own heat. The output from torch 16 is heat energy which is applied to operate on waste materials 12. In order to generate the desired gaseous by-products as described above, it may be necessary to introduce a quantity of water to the materials 12 being treated, in the form of steam which is approximately equal in weight to the quantity of waste material 12 being processed.

The resultant output of the process described comprises vitrified residue 14, gas by-product 36 and water. The water output from the waste treatment process is recycled back into the water supply to make steam. A vitrified residue 14 remains in a column near the bottom of hole 30 (FIG. 2), which column will eventually be coalesced with other vitrified columns produced in the landfill. This layer will be the final form after the remediated, molten waste 24 has cooled and solidified. The gas by-product 36 is next transmitted through a cleaning chemical 38 which both filters the gaseous effluent and reacts with it chemically to improve the value of and commercial usefulness the result.

Plasma arc torches as are used in the present invention also are substantially unaffected by the presence of water in the operating environment. These torches, particularly as operated in the non-transferred mode, will operate under water, thus being effective even if the landfill basin is partially filled with water, liquid wastes or the like.

By the process described above, the volume occupied by waste materials in a landfill is reduced to a small percentage of its original volume in each successive remediation and volume reduction procedure, depending on the nature of the materials treated.

Whereas the description above related to landfill sites primarily used for residential municipal waste, the principles are applicable as well to deposits of industrial wastes, including hazardous or toxic wastes, whether enclosed in sealed containers or in loose form. Situations such as dumps for drums of undesirable petroleum by-products, highly active cleaning agents, low level radioactive materials or heavy metals are equally susceptible to the treatment herein described. Due to the efficiency and high energy output of the plasma arc torch, the organic materials are broken down by pyrolysis essentially into harmless basic elements and compounds to recombine into useful gases, and the inorganic remainders are vitrified and significantly reduced in volume. The nature of the vitrification is such as to effectively immobilize, encapsulate and make unleachable any residual dangerous materials. The particulars of which plasma gas to use, what degree of heat is appropriate, and whether to process the output gas by-product through a cleaning step for commercialization, as with the case of municipal landfill, depends upon the exact nature of the waste materials involved. The scope and principles of the invention disclosed are not to be considered limited by the particulars of the preferred embodiment described herein, but are defined by the claims which follow.

We claim:

1. A method for in-situ treatment and remediation of waste materials collected in a landfill by means of a plasma torch having appropriate connected utilities, comprising:
   (a) forming a borehole of a size sufficient to accommodate a plasma torch and extending from an upper end to a lower end at a predetermined depth below the landfill's top surface and passing through waste materials collected in the landfill;
   (b) lowering a plasma torch with connected utilities into said formed borehole and suspending the torch at a location above and proximate said borehole lower end;
   (c) utilizing the connected plasma torch utilities to operate said torch to create a plasma arc flame of sufficient temperature to pyrolize, remediate and vitrify, substantially in the absence of combustion, said waste materials located proximate said plasma arc flame, thus forming a molten mass, and permitting any resultant by-product gases to rise in said formed borehole;
   (d) collecting said by-product gases for treatment and recycling;
   (e) deenergizing the torch and stopping production of said plasma arc flame;
   (f) removing the plasma torch with its connected utilities from the borehole; and
   (g) allowing said molten mass to cool and solidify thereby to produce a column of remediated and vitrified waste material which volume is substantially less than the volume of waste material from which the vitrified column was produced.

2. A method for in-situ pyrolysis, remediation and vitrification of waste materials collected in a landfill as claimed in claim 1 further comprising the step of inserting a heat destructible casing into said formed borehole prior to lowering said torch therein.

3. A method for in-situ pyrolysis, remediation and vitrification of waste materials collected in a landfill as claimed in claim in which said formed borehole is substantially vertical.

4. A method for in-situ pyrolysis, remediation and vitrification of waste materials collected in a landfill as claimed in claim 3 in which the step of collecting a gas by-product is accomplished in a gas collecting hood covering the top of said formed borehold.

5. A method for in-situ pyrolysis, remediation and vitrification of waste materials collected in a landfill as claimed in claim 1 further comprising the step of vitrifying waste material by repeating the method claimed in a plurality of boreholes formed in the landfill.

6. A method for in-situ pyrolysis, remediation and vitrification of waste materials collected in a landfill as claimed in claim 1 further comprising the step of selecting the distance between adjacent holes so that respective melted and solidified columns coalesce together.

7. A method for in-situ pyrolysis, remediation and vitrification of waste materials collected in a landfill as claimed in claim 1 further comprising the step of operating said plasma torch in a non-transferred mode.

8. A method for in-situ pyrolysis, remediation and vitrification of waste materials collected in a landfill as claimed in claim 1 further comprising the step of raising said plasma torch in said borehole to operate at a new level.

9. A method for in-situ pyrolysis, remediation and vitrification of waste materials collected in a landfill as claimed in claim 2 in which said formed borehole is substantially vertical.

10. A method for in-situ pyrolysis, remediation and vitrification of waste materials collected in a landfill as claimed in claim 4 further comprising the step of vitrifying waste material by repeating the method claimed in a plurality of boreholes formed in the landfill.

11. A method for in-situ pyrolysis, remediation and vitrification of waste materials collected in a landfill as claimed in claim 5 further comprising the step of selecting the distance between adjacent holes so that respective melted and solidified columns coalesce together.

12. A method for in-situ pyrolysis, remediation and vitrification of waste materials collected in a landfill as claimed in claim 6 further comprising the step of operating said plasma torch in a non-transferred mode.

13. A method for in-situ pyrolysis, remediation and vitrification of waste materials collected in a landfill as claimed in claim 7 further comprising the step of raising said plasma torch in said borehole to operate at a new level.

* * * * *

UNITED STATES PATENT AND TRADEMARK OFFICE
CERTIFICATE OF CORRECTION

PATENT NO. : 5,181,795
DATED : January 26, 1993
INVENTOR(S) : Louis J. Circeo, Jr., Salvador L. Camacho It is certified that error appears in the above-identified patent and that said Letters Patent is hereby corrected as shown below:

Column 5, line 9, "connectively" should read --convectively--.
(Applicant error)

Column 6, line 63, after "usefulness" insert --of--.
(Applicant error)

Column 8, line 13, after "claim" insert --1--. (PTO error)

Signed and Sealed this

Fourteenth Day of December, 1993

Attest:

BRUCE LEHMAN

Attesting Officer    Commissioner of Patents and Trademarks